(12) United States Patent
Hall et al.

(10) Patent No.: US 7,173,412 B2
(45) Date of Patent: Feb. 6, 2007

(54) QUADRATURE SENSOR SYSTEMS AND METHODS

(75) Inventors: Jeffrey S. Hall, Winnebago, IL (US); Lamar F. Ricks, Freeport, IL (US); Richard A. Bear, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 113 days.

(21) Appl. No.: 11/001,409

(22) Filed: Nov. 30, 2004

(65) Prior Publication Data

US 2006/0113988 A1   Jun. 1, 2006

(51) Int. Cl.
    *G01B 7/30* (2006.01)
(52) U.S. Cl. .................. 324/207.2; 324/207.25
(58) Field of Classification Search ............... 324/202, 324/207.12, 207.21, 207.22, 207.23, 207.24, 324/207.25, 207.26; 338/32 H, 32 R
See application file for complete search history.

(56) References Cited

U.S. PATENT DOCUMENTS

| | | | |
|---|---|---|---|
| 5,041,785 A * | 8/1991 | Bogaerts et al. ........ 324/207.24 |
| 5,451,868 A * | 9/1995 | Lock ......................... 324/173 |
| 5,719,496 A | 2/1998 | Wolf |
| 5,746,005 A | 5/1998 | Steinberg ................... 33/1 PT |
| 5,963,028 A * | 10/1999 | Engel et al. ............. 324/207.2 |
| 6,133,729 A | 10/2000 | Mierzwinski ............... 324/174 |
| 6,175,233 B1 | 1/2001 | McCurley et al. ........ 324/207.2 |
| 6,232,739 B1 | 5/2001 | Krefta et al. |
| 6,310,474 B1 | 10/2001 | Schroeder |
| 6,492,697 B1 | 12/2002 | Plagens et al. ............. 257/426 |
| 6,522,130 B1 * | 2/2003 | Lutz ........................ 324/207.2 |
| 6,806,702 B2 | 10/2004 | Lamb et al. ........... 324/207.25 |
| 2002/0130657 A1 | 9/2002 | Li |
| 2004/0189283 A1 | 9/2004 | Godoy et al. ............ 324/207.2 |

FOREIGN PATENT DOCUMENTS

EP   0191223   8/1986

* cited by examiner

*Primary Examiner*—Jay M. Patidar
(74) *Attorney, Agent, or Firm*—Kermit D. Lopez; Luis M. Ortiz; Matthew F. Lambrinos

(57) ABSTRACT

Sensor systems and methods are disclosed, including first and second sensing elements element co-located on a leadframe structure with respect to a particular target. In general, target-specific sensing applications can be determined by varying the distance between the first and second sensing elements on the leadframe structure with respect to a common datum point thereof in order to provide speed and direction detection data from the first and second sensing elements with respect to the particular target.

16 Claims, 6 Drawing Sheets

QUADRATURE SENSOR SYSTEMS AND METHODS

TECHNICAL FIELD

Embodiments are generally related to sensing methods and systems. Embodiments are also related to quadrature sensor methods and systems. Embodiments are additionally related to Hall effect sensing devices and speed and direction sensors.

BACKGROUND OF THE INVENTION

Many different types of position sensors have been implemented in commercial, industrial and consumer applications. Some position sensors are intended to detect the movement of a target along a linear path while others detect the rotation of a target, such as a gear with a plurality of teeth, about an axis of rotation. The target and sensor can be arranged so that the target is provided with a plurality of magnetic poles that are sensed by a magnetically sensitive component. Alternatively, the sensor may be provided with a biasing magnet and the target can comprise a plurality of ferromagnetic discontinuities, such as gear teeth, that are sensed by the device.

One particular type of position sensing device is based on quadrature sensing, which involves the use of two signals that are offset from each other by 90 degrees so that a comparison of the signals will provide meaningful information with regard to the position of a target. Quadrature sensors generally provide two outputs that are 90 degrees out of phase. The rising and falling edges, of the output signals are generally utilized to determine the speed while the phase shift between the two output signals indicates direction of movement or rotation of the target. The two outputs can be obtained from two sensing elements that are physically spaced at a set distance to match an application-specific target.

The spacing of the sensing elements with respect to one another and the absolute placement of the sensing elements within the sensor package are critical to sensor's proper functioning. Maintaining the placement of the individual sensing elements often requires significant mechanical keying that is costly and inaccurate. Such mechanical features may also need to be recreated for each application. The physical size of the two sensing elements and associated mechanical features also limits how small the overall sensor can be made.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved sensor method and system.

It is another aspect of the present invention to provide an improved quadrature sensor, including methods and systems thereof.

It is yet another aspect of the present invention to provide a quadrature sensor device that utilizes Hall effect sensing elements in a common package or chip carrier.

The aforementioned aspects of the invention and other objectives and advantages can now be achieved as described herein. Sensor systems and methods are disclosed, including first and second sensing elements co-located on a leadframe structure with respect to a particular target. In general, target-specific sensing applications can be determined by varying the distance between the first and second sensing elements on the leadframe structure with respect to a common datum point thereof in order to provide speed and direction detection data from the first and second sensing elements with respect to the particular target.

In one particular embodiment, such a distance can be, for example, approximately one half the width of a target feature. The first and second sensing elements are located on respective die pads attached to the leadframe structure. Such first and second sensing elements can be implemented as Hall effect sensing elements. The leadframe structure can be implemented as a leadless plastic chip carrier.

The leadframe structure itself can be configured as a common leadframe structure shared by the first and second sensing elements. The first and second sensing elements can be spaced at a distance with respect to one another to match an application-specific target. Also, the first and second sensing elements respectively can provide first and second outputs that are 90-degrees out of phase with respect to the particular target

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the embodiments disclosed herein.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
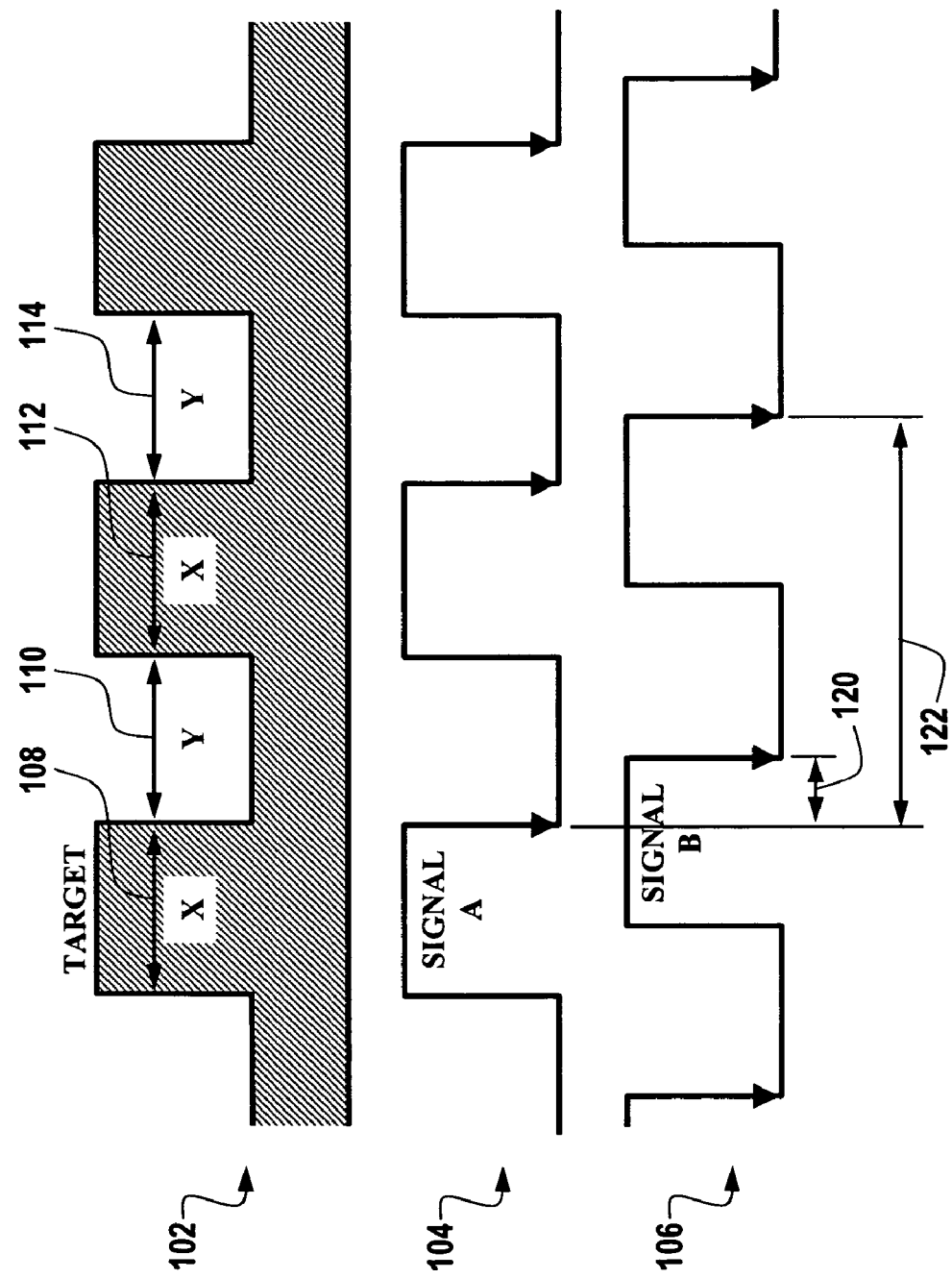
FIG. 1 illustrates an example phase shift between first and second signals which can be generated by a quadrature sensor system, in accordance with embodiments of the present invention.

FIG. 1 illustrates an example phase shift between a first signal 104 and a second signal 106, which can be generated by a quadrature sensor system, in accordance with embodiments of the present invention. A plurality of target features (teeth and slots) are depicted in FIG. 1. The teeth are assumed to possess a length of X and the slots are assumed to possess a length of Y. Signal 104 represents Output Signal A and signal 106 represents Output Signal B. "X" represents a length 108 while "Y" represents a length 110. Similarly, "X" represents a length 112 and "Y" represents a length 114. Thus, lengths 108, 112 each possess a length "X". Lengths 110, 114 each possess a length Y. The phase shift between signal 104 (i.e., Signal A) and signal 106 (i.e., Signal B) is approximately equal to ½ the average feature width (e.g., approximately X/2 mm), or ½ the average feature width plus the slot width and the tooth width (e.g., approximately X/2+Y+X mm).

Figure 2:
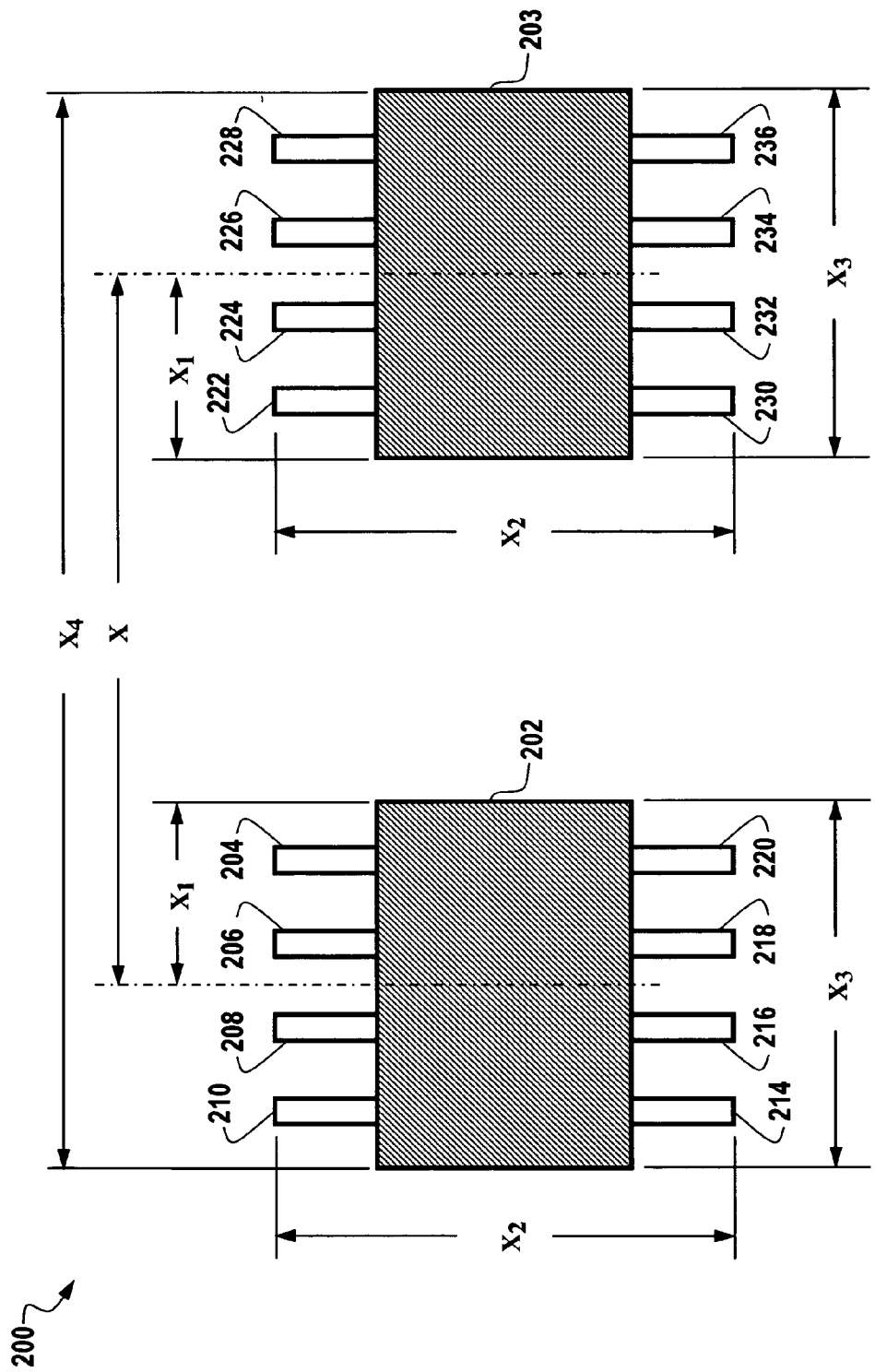
FIG. 2 illustrates a quadrature sensor system, which can be implemented in accordance with a first embodiment.

FIG. 2 illustrates a quadrature sensor system 200, which can be implemented in accordance with a first embodiment. System 200 includes a first sensor element 202 and a second sensor element 203. Sensor element 202 includes a plurality of pins 204, 206, 208, 210, 214, 216, 218, and 220. Sensor element 203 includes a plurality of pins 222, 224, 226, 228, 230, 232, 234, and 236. Each sensor element 202 and 203 can be implemented, for example, as an 8-pin SOIC sensing package containing one or more sensing elements thereof (e.g., Hall-effect sensing elements). Sensor elements 202 and 203 can be co-located in a common package (e.g., a chip carrier).

Sensor element 202 possesses a length $X_3$. Sensor element 203 also possesses a length $X_3$. One half the length of sensor packages 202 and 203 is represented in FIG. 2 as $X_1$. The entire distance from one end of sensor element 203 to the other end of sensor element 202 is represented by variable $X_4$. The width of each package from pin end to pin end is represented by the variable $X_2$. In this example, the center of the magnetic sensing element is assumed to be in the center of each package. Therefore the distance between the centerline of sensor element 202 to the centerline of sensor element 203 is expressed by variable X. The Phase shift between the output signals is directly a function of distance X as well as the rotational alignment of the elements with respect to the target.

Sensor elements 202 and 203 can be implemented as Hall-effect elements, which rely on the reaction between a current flowing between a first set of contacts and an orthogonally applied magnetic field to generate a voltage across a second set of contacts. Hall-effect elements are generally fabricated using a lightly doped n-type layer for heightened sensitivity to variations in magnetic field intensity. An example of a Hall-effect element, which can be adapted for use with one or more of the embodiments described herein is disclosed in U.S. Pat. No. 6,492,697, "Hall-effect element with integrated offset control and method for operating hall-effect element to reduce null offset," which issued to Plagens et al on Dec. 10, 2002, and which is assigned to Honeywell International Inc. U.S. Pat. No. 6,492,697 is incorporated herein by reference.

The placement of sensing elements 202 and 203 with respect to one another and to a common data point provides very accurate and precise tolerances through standard die placement (e.g., pick-and-place). Changing the sensing element spacing for application specific targets is simply a matter of implementing a change in the die placement in the package.

Figure 3:
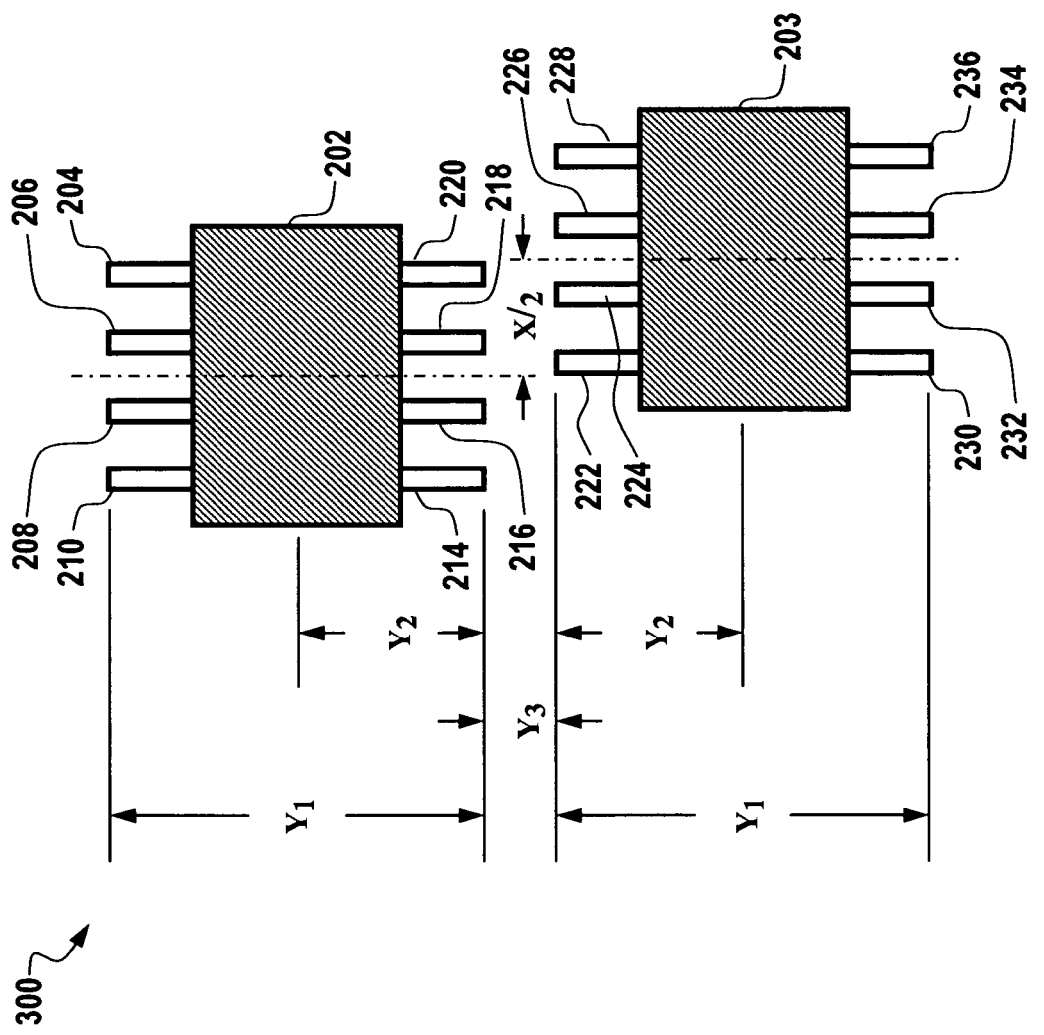
FIG. 3 illustrates a quadrature sensor system, which can be implemented in accordance with a second embodiment.

FIG. 3 illustrates a quadrature sensor system 300, which can be implemented in accordance with a second embodiment. Note that in FIGS. 1–2, similar or identical parts or elements are generally indicated by identical reference numerals. In the configuration of system 300, two separate sensor elements 202 and 203 are co-located with respect to one another and a common data point. For example, the width of each sensing element 202 and 203 from pin to pin is represented by the variable $Y_1$, while one half the distance (width) from the center of each package or sensor element 202, 203 to respective pins thereof is represented by the variable $Y_2$. The distance between the end of pins 214, 216, 218, 220 of sensor element 202 and the end of pins 22, 224, 226, 228 of sensor element 203 is represented by the variable $Y_3$. In this example, the center of the magnetic sensing element is assumed to be in the center of each package. Therefore the distance between the centerline of sensor element 202 to the centerline of sensor element 203 is expressed by the expression X/2. The Phase shift between the output signals is directly a function of distance X/2 as well as the rotational alignment of the elements with respect to the target.

Figure 4:
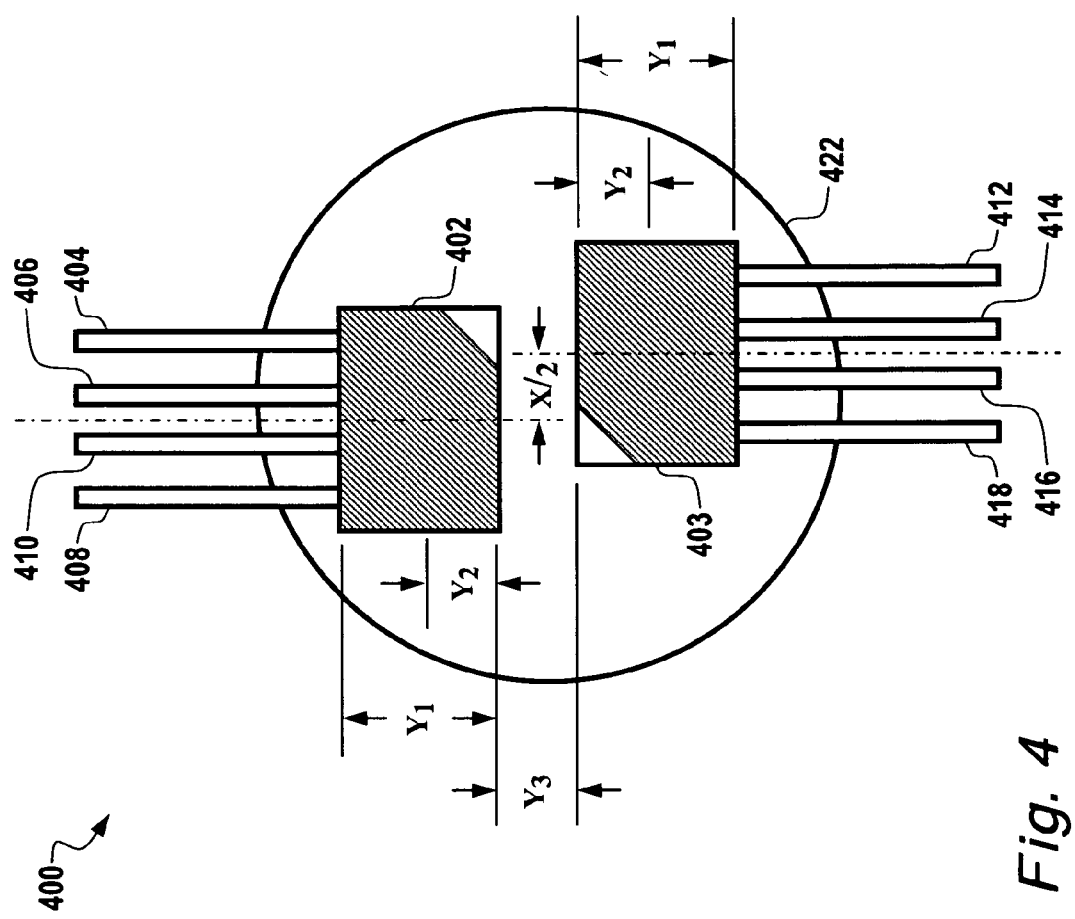
FIG. 4 illustrates a quadrature sensor system, which can be implemented in accordance with a third embodiment.

FIG. 4 illustrates a quadrature sensor system 400, which can be implemented in accordance with a third embodiment. In the embodiment of system 400, a sensor element 402 includes pins 404, 406, 404, 410 while a sensor element 403 includes pins 412, 414, 416, 418. The width of each sensor element 402, 403 is represented by the variable $Y_1$, while one half of this width is represented by the variable $Y_2$. Sensor element 402 is located a distance $Y_3$ from sensor element 403. Sensor elements 402 and 403 can be co-located within a circular area 422.

Figure 5:
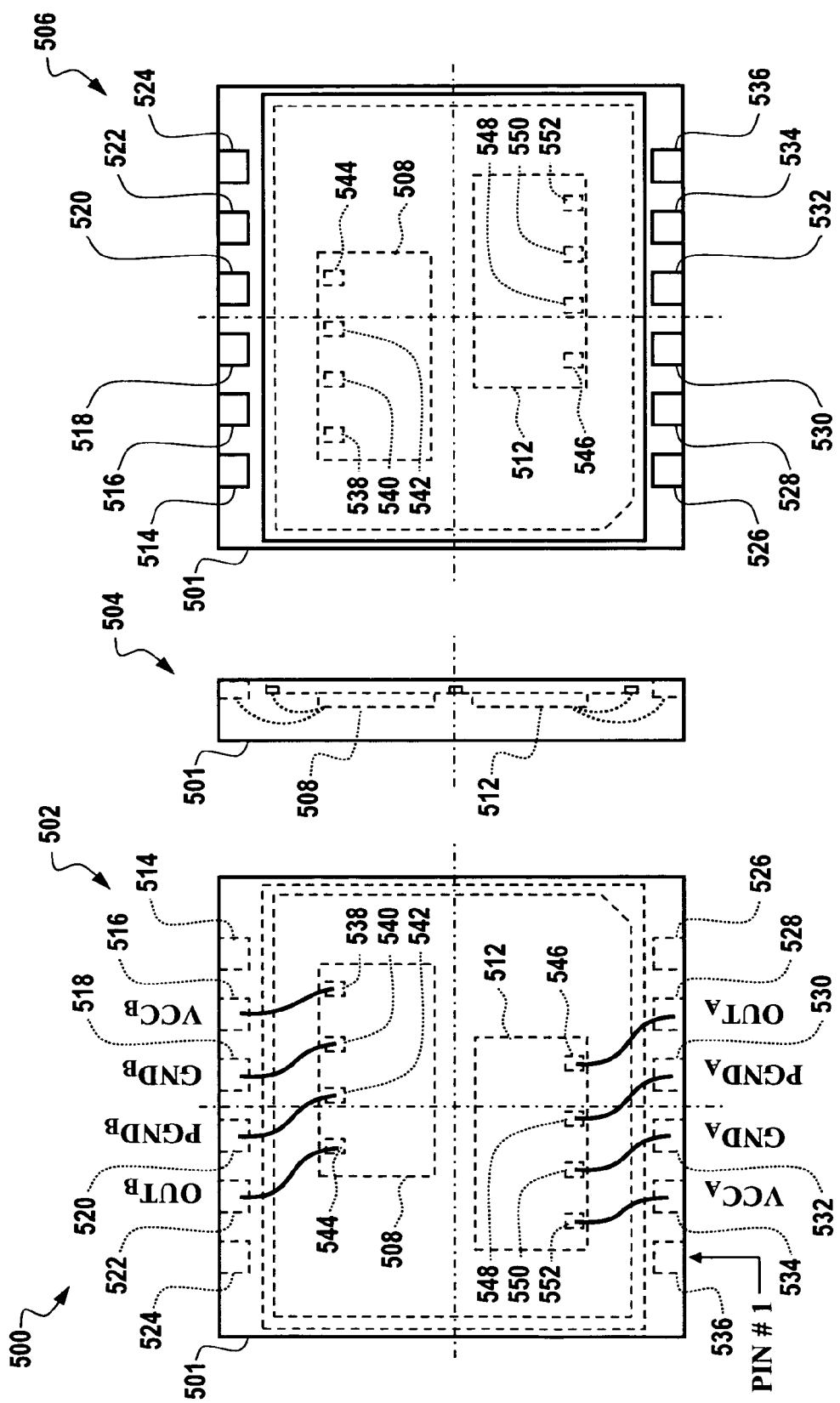
FIG. 5 illustrates a quadrature sensor system, which can be implemented in accordance with a fourth embodiment.

FIG. 5 illustrates a quadrature sensor system 500, which can be implemented in accordance with a fourth embodiment. FIG. 5 illustrates respective top, side and bottom views 502, 504 and 506. In the configuration depicted in FIG. 5, two sensing element die 508 and 512 can be implemented in a common package 501 that includes pins 514, 516, 518, 520, 524 and pins 526, 528, 530, 532, 534, 536. Sensing element die 508 includes pins 538, 540, 542, and 544, which respectively electrically communicate with pins 516, 518, 520, and 522. Similarly, sensing element die 512 includes pins 546, 548, 550, and 552, which respectively electrically communicate with pins 528, 530, 532, and 534.

Package 501 can be implemented, for example, as a common-lead frame with respective die attached pads, such as, for example, sensing element dies 508 and 512. Sensing element die 508 and 512 can be implemented, for example, as Hall-effect sensing element or sensor die. The distance between die 508 and 512 is a function of the sensing application and is preferably one-half of the target feature width. Package 501 can be configured as a leadless plastic-chip carrier. Several application specific variations can be readily implemented by varying the features between die 508 and 512.

With other conventional constructions, as depicted in FIGS. 1–4, costly and inaccurate mechanical keying features are required in fixtures or mating components. In the embodiment depicted in FIG. 5, however, the placement of the sensing elements with respect to each other and to a common datum point is held to be very accurate, while promoting precise tolerances (e.g., less than 0.05 mm) through standard placement of die 508 and 512. The co-located dies 508 and 512 within a leadless plastic carrier such as package 501 allows the sensing elements 508 and 512 to be located in a very small area, allowing the overall sensor size to be reduced. Note that die 508 and 512 can be implemented, for example, as sensor elements 202, 203 of FIGS. 2–3 or sensor elements 402, 403 of FIG. 4, depending upon design considerations.

Figure 6:
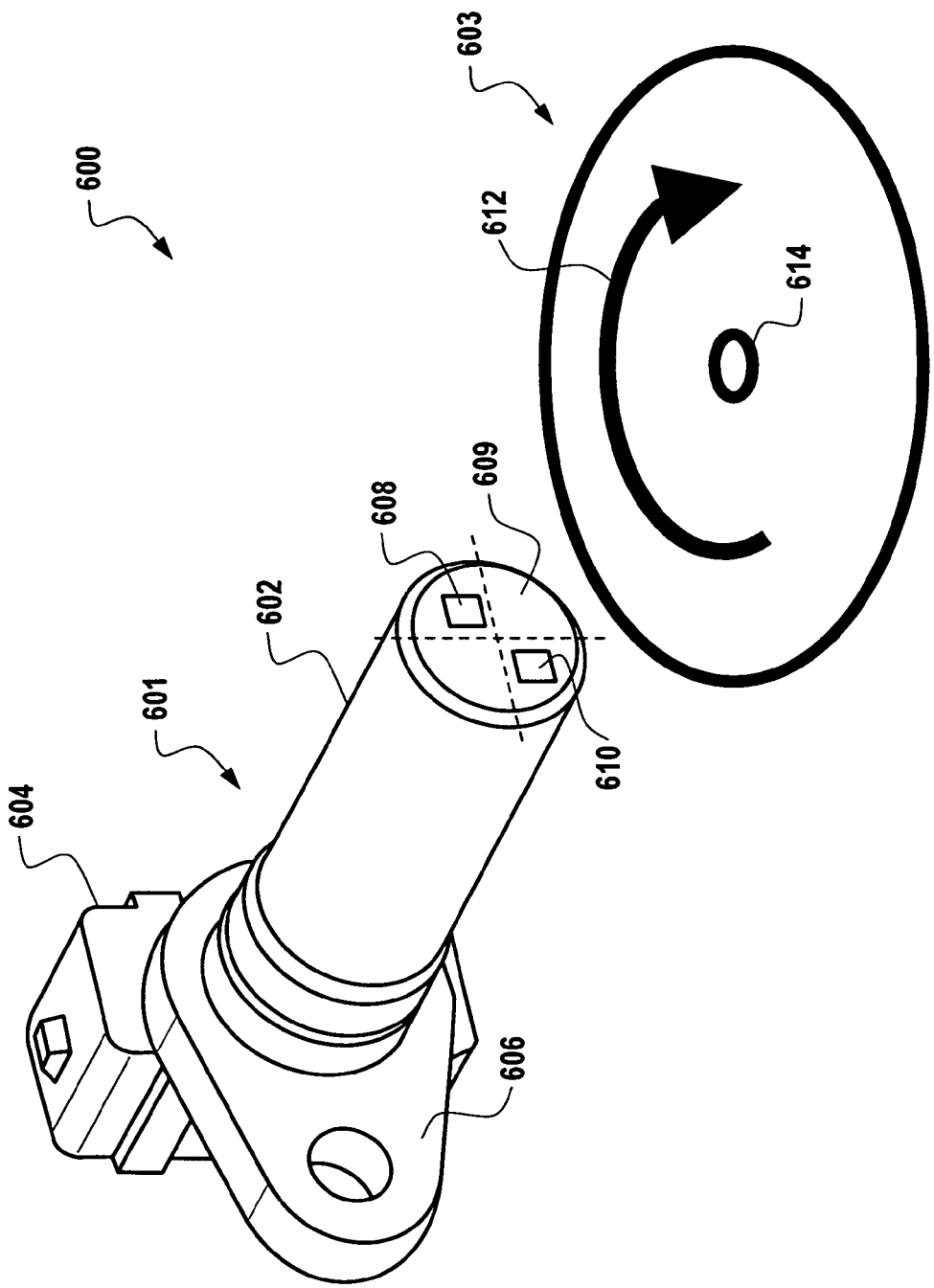
FIG. 6 illustrates a sensing system, which can be implemented in accordance with a preferred embodiment.

FIG. 6 illustrates a sensing system 600, which can be implemented in accordance with a preferred embodiment. System 600 generally includes a sensor element 608 co-located within a circular area 609 with a sensor element 610. Sensor elements 608, 610 can be implemented, for example, as sensor elements 202, 203 of FIGS. 2–3 or sensor elements 402, 403 of FIG. 4 and/or sensing die 508 and 512 depicted in FIG. 5. Circular area 609 can be located at one end of a sensor package 601 that includes a sensor body 602, a retaining portion 606 and a sensor portion 604. A target 603, which rotates as indicated by arrow 612, contains a central point 614. Sensor elements 608 and 610 are therefore co-located in a common package 601 with respect to each other and to a common datum point, such as, for example central point 614.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A sensor system, comprising:
   a first sensing die and a second sensing die co-located in a common package with respect to a particular target, wherein said first and second sensing dies include pins which respectively electrically communicate with corresponding pins of said common package; and
   wherein target-specific sensing applications are determined by varying a distance between said first and second sensing dies in said common package with respect to a common datum point thereof in order to provide speed and direction detection data from said first and second sensing dies with respect to said particular target.

2. The system of claim 1 wherein said distance is at least one half a width of a target feature associated with said particular target.

3. The system of claim 1 wherein said first and second sensing dies comprise Hall-effect sensing dies.

4. The system of claim 1 wherein said common package comprises a leadless plastic chip carrier.

5. The system of claim 1 wherein said common package includes a common leadframe structure shared by said first and second sensing dies.

6. The system of claim 1 where said first and second sensing dies are spaced at said distance with respect to one another to match an application-specific target.

7. The system of claim 1 wherein said first and second sensing dies respectively provide first and second outputs that are 90-degrees out of phase with respect to said particular target.

8. A quadrature sensor system, comprising:
   a first Hall-effect sensing die and a second Hall-effect sensing die co-located in a common leadless plastic chip carrier, wherein said first and second Hall-effect sensing dies respectively provide first and second outputs that are 90-degrees out of phase with respect to a particular target, wherein said first and second Hall-effect sensing dies include pins which respectively electrically communicate with corresponding pins of said common leadless plastic chip carrier; and
   wherein target-specific sensing applications are determined by varying a distance between said first and second Hall-effect sensing dies on said common leadless plastic chip carrier with respect to a common datum point thereof in order to provide speed and direction detection data from said first and second Hall-effect sensing dies with respect to said particular target.

9. The system of claim 8 wherein said distance is at least one half a width of a target feature associated with said particular target.

10. The system of claim 8 wherein said first and second Hall-effect sensing dies are spaced at said distance with respect to one another to match an application-specific target.

11. A sensor method, comprising the steps of:
    co-locating a first sensing die and a second sensing die in a common package with respect to a particular target, electrically communicating pins on said first and second sensing dies to corresponding pins on said common package; and
    implementing target-specific sensing applications by varying a distance between said first and second sensing dies in said common package with respect to a common datum point thereof in order to provide speed and direction detection data from said first and second sensing dies with respect to said particular target.

12. The method of claim 11 further comprising the step of setting said distance as at least one half a width of a target feature associated with said particular target.

13. The method of claim 11 further comprising the step of configuring said first and second sensing dies to comprise Hall-effect sensing dies.

14. The method of claim 11 further comprising the step of configuring said common package to comprises a leadless plastic chip carrier.

15. The method of claim 11 wherein said common package includes a common leadframe structure shared by said first and second sensing dies.

16. The method of claim 11 wherein said first and second sensing dies respectively provide first and second outputs that are 90-degrees out of phase with respect to said particular target.

* * * * *